United States Patent [19]
Adams

[11] Patent Number: 5,988,000
[45] Date of Patent: Nov. 23, 1999

[54] MULTI DIMENSIONAL STRAIN SENSOR

[75] Inventor: Brian Todd Adams, Pleasant Hill, Ill.

[73] Assignee: Case Corporation, Racine, Wis.

[21] Appl. No.: 09/103,002

[22] Filed: Jun. 23, 1998

[51] Int. Cl.$^6$ ...................................................... G01L 5/16
[52] U.S. Cl. ...................................................... 73/862.044
[58] Field of Search ....................... 73/862.041, 862.042, 73/862.043, 862.044, 862.045, 862.046

[56] References Cited

U.S. PATENT DOCUMENTS

| | | |
|---|---|---|
| 2,520,923 | 9/1950 | Franzel et al. . |
| 3,246,701 | 4/1966 | Schulz . |
| 3,589,175 | 6/1971 | Bock . |
| 3,814,188 | 6/1974 | Ahne . |
| 3,913,392 | 10/1975 | Nagase et al. ............................. 73/766 |
| 4,367,656 | 1/1983 | Fritsch . |
| 4,456,074 | 6/1984 | Prudenziati . |
| 4,516,110 | 5/1985 | Overmyer ............................ 340/323 R |
| 4,640,138 | 2/1987 | Meyer et al. ....................... 73/862.045 |
| 5,511,812 | 4/1996 | Milner . |
| 5,526,702 | 6/1996 | Schedrat et al. . |
| 5,883,337 | 3/1999 | Dolan et al. .............................. 177/163 |
| 5,894,094 | 4/1999 | Kuchler et al. ..................... 73/862.044 |

*Primary Examiner*—Max Noori
*Attorney, Agent, or Firm*—Mayer, Brown & Platt

[57] ABSTRACT

A multi-dimensional strain sensor for measuring the strain forces on a drawbar or other load bearing member. The strain sensor is used in conjunction with a load bearing member having a top surface, a bottom surface, a left surface and a right surface. The strain sensor has a four strain gauge pairs, each located on the top, bottom, right and left surfaces. The gauges are configured to output voltage relative to strain placed on them. The outputs from the four gauges are amplified. The outputs from the top and bottom gauges are then input to a differential amplifier in order to determine vertical load. The outputs from the right and left gauges are input to a differential amplifier to determine side load. The sum of the top and bottom gauges and the sum of the left and right gauges are input to a differential amplifier to determine draft load. An analog to digital converter is coupled to the gain amplifiers in order to zero the gauges.

16 Claims, 3 Drawing Sheets

MULTI DIMENSIONAL STRAIN SENSOR

FIELD OF INVENTION

This invention relates to a strain sensor. More specifically, this invention relates to a strain gauge system which measures multiple strain forces on a load bearing member.

BACKGROUND OF INVENTION

Work vehicles such as tractors and crawlers have the capability to tow various pulled implements. The implements may be, for example, storage carts, planters, sprayers, tillers, etc. Such work vehicles typically have a drawbar pivot point for the attachment of a load bearing member such as a drawbar which is in turn attached to the pulled implement. Many of the pulled implements are very heavy, resulting in strain on the engine and chassis of the work vehicle. In order to determine the load of the implement on the work vehicle for implement or vehicle adjustment or measurement, it is desirable to measure the side, vertical, and draft load placed on the work vehicle by the mobile implement. Measuring strain on different dimensions is useful for other purposes such as draft control to control the draft force of the pulled implement by changing operating depth.

Presently, the strain gauges may sense strain in one direction, possibly compensating for strain in other directions or environmental effects. Typically such gauges are based on four resistors in a Wheatstone bridge configuration. One, two, or all of the resistors of the "bridge" are strain gauges. The change in voltage across the "bridge" is proportional to the change in resistance due to the strain placed on the gauge or gauges. The resulting voltage output signal represents the strain. The signal is then amplified and filtered to obtain a representation of the strain value. Typically, the Wheatstone bridge is configured to sense reactions from loads in only one direction.

Thus, such bridges have limited utility because they cannot differentiate strain in multiple directions. Additionally, the gain involved in amplifying such a signal is limited by common mode noise from the power source thus restricting strain sensing ability. Finally, temperature affects the strain measurements by changing resistance in the gauge from thermal strain in the material.

Therefore, it would be beneficial to provide a strain gauge system which differentiates strain in multiple directions. There is a further need for a strain gauge system which allows large gains of the gauge signal without saturating the output or amplifying noise. Further there is a need for a strain gauge system which has temperature compensation. There is also a need for a strain gauge system that provides high common mode rejection and electronic offset of the outputs.

SUMMARY OF THE INVENTION

The present invention is embodied in a system for measuring the strain forces on a load bearing member having a top surface, a bottom surface, a right surface and a left surface. The system has a top strain gauge located on the top surface of the load bearing member. The system also has a bottom strain gauge located on the bottom surface of the load bearing member. The system also has a right strain gauge located on the right surface of the load bearing member. The system also has a left strain gauge located on the left surface of the load bearing member. A voltage comparison circuit is coupled to the output of the top, bottom, right and left strain gauges. The voltage comparison circuit has a top, bottom, right and left output. The top output is derived from comparing the difference between the output of the top strain gauge and a constant value. The bottom output is derived from the difference between the output of the bottom strain gauge and a constant value. The right output is derived from the difference between the output of the right strain gauge and a constant value. The left output is derived from the difference between the output of the left strain gauge and a constant value. A vertical load circuit is coupled to the top and bottom outputs and outputs the vertical load by determining the difference between the top and bottom outputs. A side load circuit is coupled to the right and left outputs and outputs the side load by determining the difference between the right and left outputs.

The present invention is also embodied in a method of determining strain forces on a load bearing member having a top surface, a bottom surface, a right surface and a left surface. The strain on the top surface as a top strain signal is measured. The strain on the bottom surface as a bottom strain signal is measured. The strain on the right surface as a right strain signal is measured. The strain on the left surface as a left strain signal is measured. The vertical load is measured by determining the difference between the top and bottom signals. The side load is measured by determining the difference between the left and right outputs.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

Figure 1:
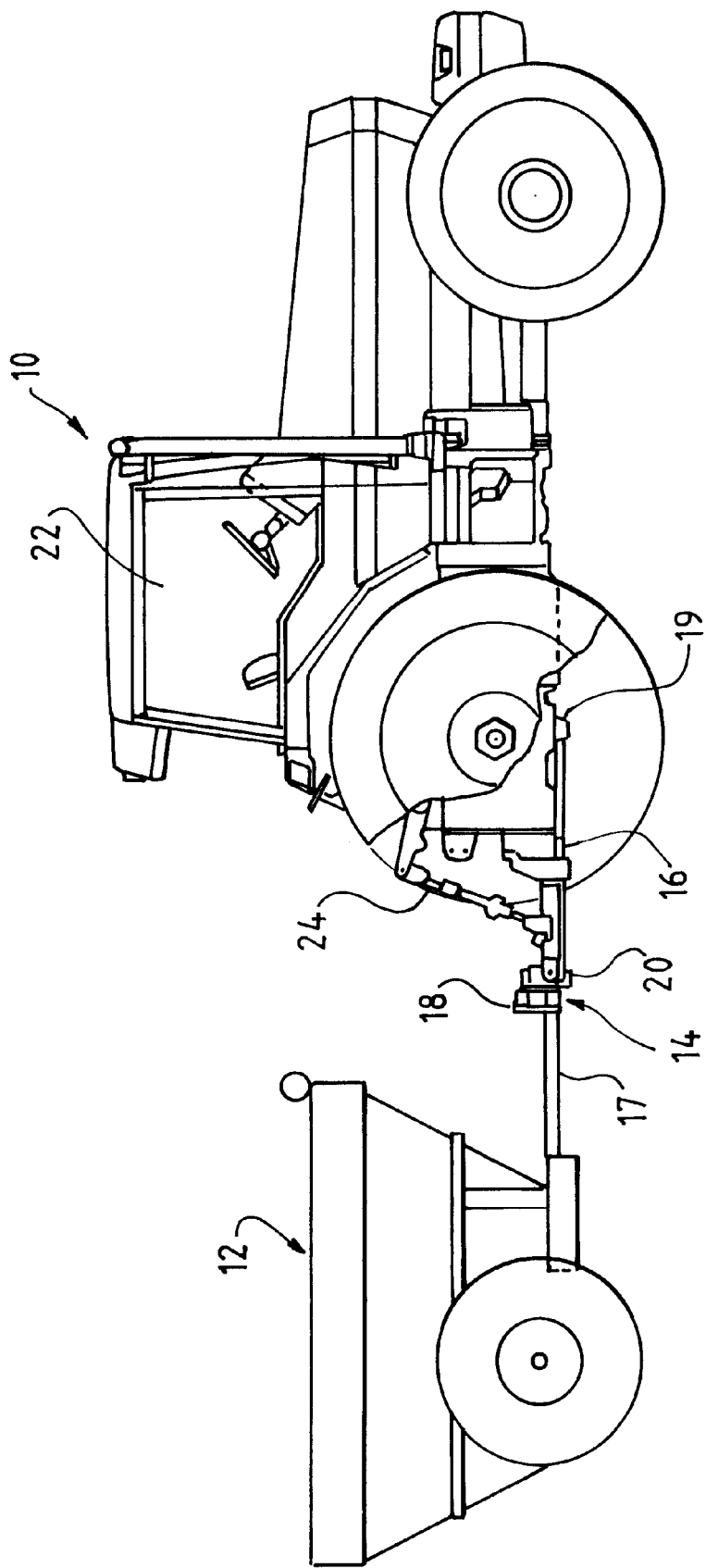
FIG. 1 is a perspective view of a work vehicle towing a mobile implement by a drawbar having a strain gauge system according to the present invention.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Referring now to the drawings and more particularly to FIG. 1, there is shown a side perspective diagram of a work vehicle 10. In this embodiment, the work vehicle 10 is a Magnum Model tractor manufactured by Case Corporation. Of course any type of wheeled or tracked vehicle may be used for the work vehicle 10. The work vehicle 10 is capable of towing various pulled implements such as a grain cart 12. Other implements may be drawn by the work vehicle 10 and may include wheeled or nonwheeled devices such as planters, seeders, tillers, sprayers, etc. The vehicle 10 has a hitch pivot point 14 on a load bearing member such as drawbar 16. The cart 12 has a tongue 17 with a hitchpin 18 which is attached to the drawbar 16 at hitch point 14. The opposite end of drawbar 16 is attached to the vehicle 10 at a drawbar pivot point 19. The drawbar 16 may swivel about a pin (not shown) at drawbar pivot point 19. The tongue 17 may swivel on hitchpin 18 at hitch point 14. The drawbar 16 has a strain sensor 20 according to the present invention. The strain sensor 20 is located near the hitch point 14 and is electrically coupled to an instrument panel in an operator compartment 22 on the work vehicle 10.

Alternatively, mounted or semi-mounted implements may be attached to the work vehicle 10 via a three point hitch 24. It is to be understood that the strain sensor 20 may be mounted on the three point hitch 24 if the work vehicle is connected to a mounted or semi-mounted implement. In fact, the present invention may be used with any load bearing member where it is desirable to measure the strain in several directions.

Figure 2:
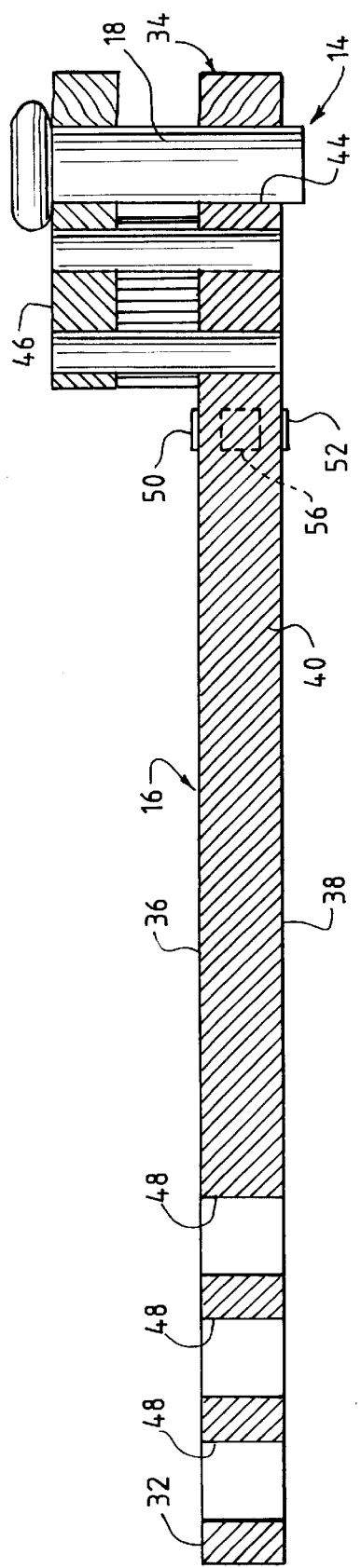
FIG. 2 is a side view of the drawbar having a strain gauge system according to the present invention.
Figure 3:
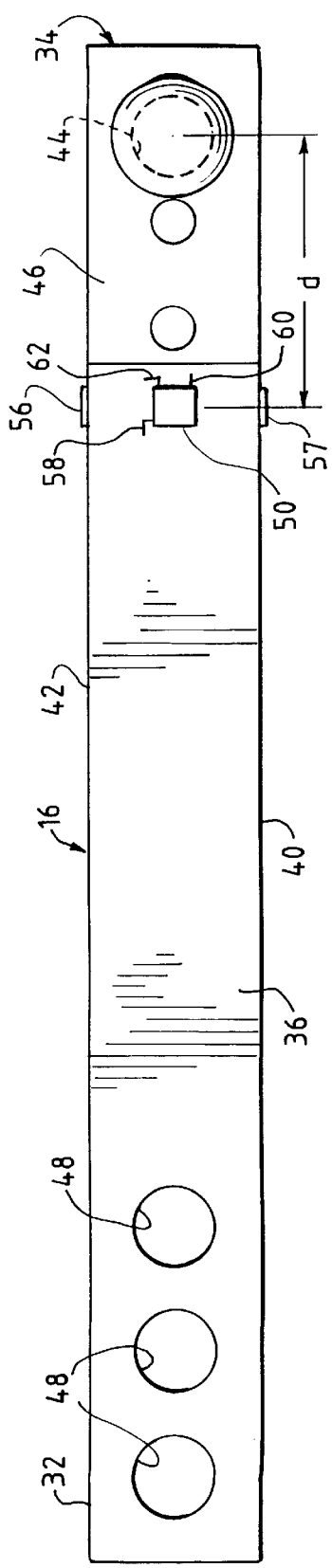
FIG. 3 is a top view of the drawbar having a strain gauge shown in FIG. 2.

FIG. 2 and FIG. 3 are views of the drawbar 16 in FIG. 1. FIG. 2 is a side view of the drawbar 16 while FIG. 3 is a top view of the drawbar 16. The drawbar 16 has a pivot end 32 and a hitch end 34. The drawbar 16 is generally rectangular in shape having a top surface 36, a bottom surface 38, a right surface 40 and a left surface 42. The hitch end 34 has a hitch pin hole 44 which is used to hold the hitch pin 18 attached to the tongue 17 of the grain cart 12. A hammer strap 46 also holds the tongue 17 to the hitch end 34 of the drawbar 16. The pivot end 32 has a series of pivot holes 48 which are installed on the drawbar pivot point 19 of the work vehicle 10. The pivot holes 48 mate with the pin on vehicle 10 at drawbar pivot point 19.

The strain sensor 20 has a top strain gauge 50 and a bottom strain gauge 52 which are located on the top surface 36 and the bottom surface 38 respectively. The strain sensor also has a right strain gauge 54 and a left strain gauge 56 which are located on the right side 40 and the left side 42 respectively. The top and bottom strain gauges 50 and 52 are located opposite each other while the right and left strain gauges 54 and 56 are located opposite each other. The gauges 50, 52, 54 and 56 are located a set distance, d, away from the hitch pin hole 44. In the preferred embodiment, the gauges 50, 52, 54 and 56 are located immediately behind the hammer strap 46. This allows the drawbar 16 to be used in the innermost position on the drawbar pivot holes 48 for heavy loads such as grain carts. This location also reduces the moment caused by the vertical load on the hitch 14. Since the strain from the vertical load will likely be the dominating signal, the reduced moments allow higher gains for the circuit amplifiers to be used. Thus, draft may be measured more accurately by providing output signals which may be more readily amplified.

Each of the strain gauges 50–56 are X-Y strain gauges which have two wire patterns in an orthogonal pattern. The resistance of the wires changes in response to strain in a plane parallel to the direction of the wire pattern. There are two wire patterns in each of the gauges 50–56, each pattern of wires being sensitive to strain in either the X-plane or the Y-plane. In the preferred embodiment, the gauges 50–56 are Omega Model SG-3/350-XY41 strain gauges.

The strain gauges 50–56 each have a positive lead such as lead 58 on gauge 50 which is coupled to one end of the Y plane wire pattern of the gauge 50. The opposite side of the gauge 50 has a negative lead 60 which is coupled to one end of the X plane wire pattern. A signal lead 62 is electrically connected to the opposite ends of both the X plane and Y plane wire pattern of the gauge 50. The strain gauges 50–56 are thus configured as voltage dividers between the X plane wire pattern and the Y plane wire pattern in the present invention.

The strain gauges 50–56 provide change in resistance, $\Delta R_g$, which is calculated according to the below formula:

$$\Delta R_g = F \cdot R_g \cdot \epsilon$$

where F is the gauge factor, $R_g$ is the nominal gauge resistance and $\epsilon$ is the strain placed on the gauge. The strain, $\epsilon$, is calculated according to the following:

$$\epsilon = \sigma/E$$

where $\sigma$ is the stress and E is the modulus of elasticity. The stress due to draft load, $\sigma$, is calculated by dividing the axial force on the drawbar by the cross sectional area of the drawbar. In such a manner, by measuring the voltage change due to the change in resistance, the strain may be calculated. The side and vertical loads may be calculated in a similar manner using change in resistance in the appropriate dimension.

The strain gauges 50–56 provide better strain sensitivity since they may measure strain proportional to one plus Poisson's ratio due to the capability of the x-y gauge being used in a voltage divider configuration. Poisson's ratio is well known as the lateral strain divided by the axial strain. The voltage divider configuration provides inherent temperature compensation since the gauge resistance on either side of the signal lead 62 deforms equally due to changes in temperatures.

Figure 4:
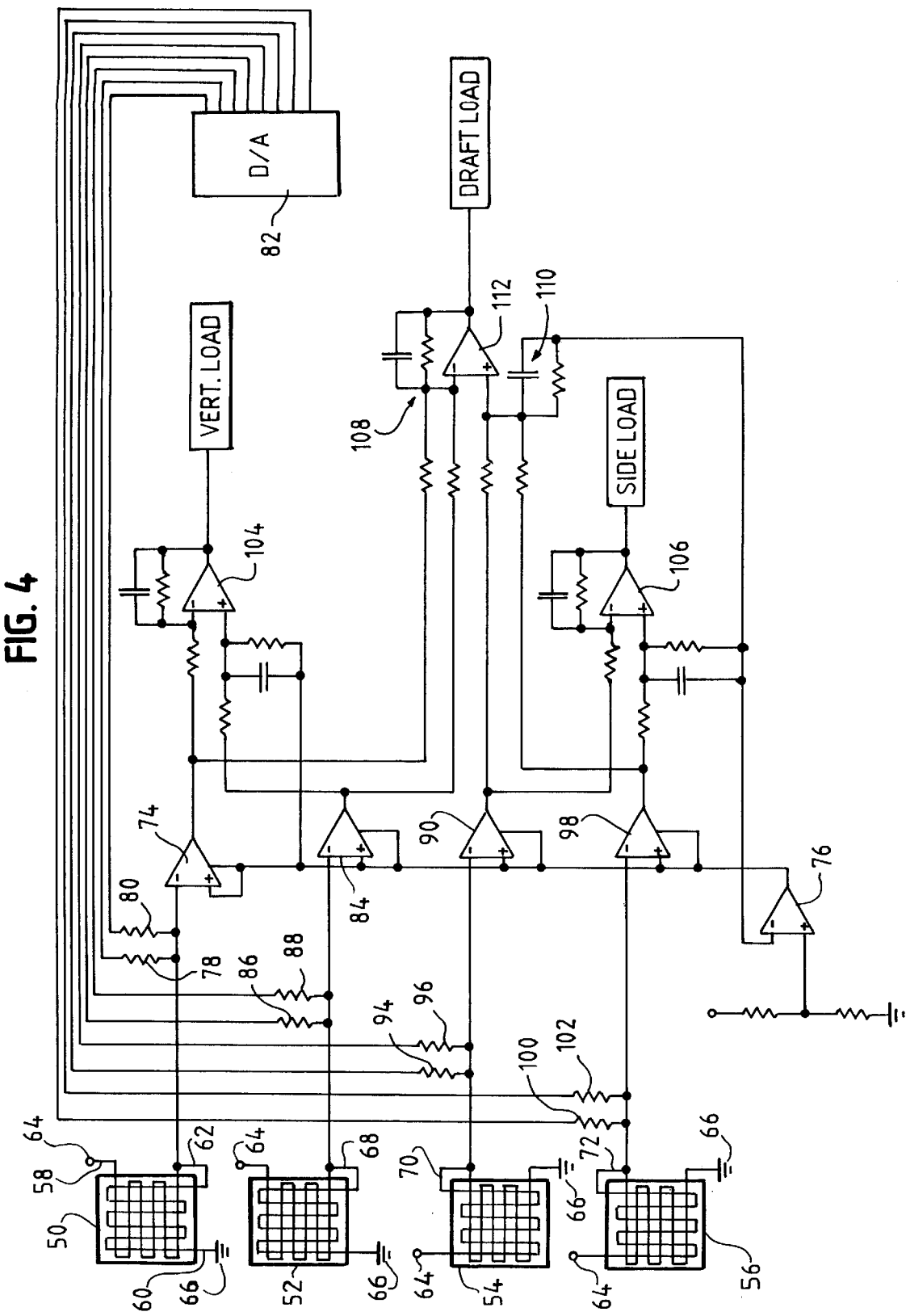
FIG. 4 is a circuit diagram of the measurement electronics of the strain gauge system according to the present invention.

FIG. 4 is a circuit diagram showing the measuring circuitry coupled to the strain gauges 50–56. The positive leads of the top and bottom gauges 50 and 52 are coupled to a voltage source 64. The negative lead of the top and bottom gauges 50 and 52 are coupled to a ground reference 66. Each of the gauges 50–56 are coupled to a signal lead 62, 68, 70 and 72 respectively.

The polarity of the right and left gauges 54 and 56 is reversed from that of the top and bottom gauges 50 and 52. Thus, the positive lead of the right and left gauges 54 and 56 is coupled to the ground reference 66 while the negative leads of the right and left gauges 54 and 56 are coupled to the voltage source 64. As will be explained below, the reversal of polarity allows the amplifier for the draft load to have a large gain and lower noise.

The signal lead 62 of the top gauge 50 is coupled to the negative input of a top instrument amplifier such as differential amplifier 74. The other input of the top differential amplifier 74 is coupled to a constant voltage source 76 which produces an voltage output which is half the voltage of the voltage source 64. The reference voltage of the amplifier 74 is set to half of the voltage source 64 in order to bias the output signal. The top signal lead 62 is coupled through resistors 78 and 80 to the output of a digital to analog converter 82. The top differential amplifier 74 is an Analog Devices AD620 instrument amplifier with a gain of 129 in the preferred embodiment, but any suitable instrument amplifier with sufficiently high gain may be used.

Normally with no load, the signal lead 62 will output half of the voltage source 64 across the top gauge 50. The output of the top differential amplifier 74 will thus be the constant voltage produced by voltage source 76. Changes in the strain on the drawbar 16 and thus on the top gauge 50 will change the resistance of the top gauge 50 and thus change the voltage at the signal lead 62. The output of the top differential amplifier 74 will thus be the amplified difference between half of the voltage source 64 taken from the voltage source 76 and the signal lead 62. This output reflects the strain on the top of the drawbar 16 measured by the top voltage gauge 50.

The other strain gauges 52, 54 and 56 function in a similar manner. The bottom signal lead 68 of the bottom gauge 52 is coupled to the negative input of an instrument amplifier such as bottom differential amplifier 84. The other input of the bottom differential amplifier 84 is coupled to the voltage source 76. In the preferred embodiment, the gain of the amplifier 84 is 129 but other values may be used. The bottom signal lead 68 is coupled through resistors 86 and 88 to the output of the digital to analog converter 82.

The right signal lead 70 of the right gauge 54 is coupled to the negative input of a right instrument amplifier such as differential amplifier 90. The other input of the right differential amplifier 90 is coupled to the voltage source 76. In the preferred embodiment, the gain of the amplifier 90 is 258 (twice that of the top and bottom amplifiers 74 and 84) but other values may be used. The right signal lead 70 is coupled through resistors 94 and 96 to the output of the digital to analog converter 82.

The left signal lead 72 of the left strain gauge 56 is coupled to the negative input of a left instrument amplifier such as differential amplifier 98. The other input of the left differential amplifier 98 is coupled to the output of the voltage source 76. In the preferred embodiment, the gain of the amplifier 98 is 258 but other values may be used. The left signal lead 72 is coupled through resistors 100 and 102 to the output of the digital to analog converter 82.

The digital to analog converter 82 is coupled to resistors 78, 86, 94, and 100 which are each much smaller in value than resistors 80, 88, 96 and 102. In the preferred embodiment, the resistors 80, 88, 96 and 102 are 1 megaΩ while the resistors 78, 86, 94 and 100 are 1 kΩ in value although other resistor values may be used. The digital to analog converter 82 is a 10 bit device with eight outputs. Each of the strain gauges 50–56 is coupled to two of the outputs of the converter 82. An Analog Devices AD7808, 8 channel serial digital to analog converter is used for digital to analog converter 82 in the preferred embodiment, but any other suitable digital to analog converter may be used. The digital to analog converter 82 is used to zero the gauges 50, 52, 54 and 56 by sending signals through the smaller value resistors 78, 86, 94 and 100 for coarse adjustment and larger value resistors 80, 88, 96 and 102 for fine adjustment.

The output signals from the top and bottom amplifiers 74 and 84 are coupled to the inputs of a vertical load operational amplifier 104. The output of the vertical load operational amplifier 104 is the difference between the top and bottom amplifiers 74 and 84 which is the vertical load. The gain of the vertical load operational amplifier 104 is 0.5 in the preferred embodiment in order to prevent saturation of the output. Of course other gain values may be used to optimize the side load measurement. This amplifier arrangement gives high common mode rejection from noise from the signal leads 62 and 68 since the noise in amplifier 74 is subtracted from amplifier 84. A capacitor may be added to make the amplifier 104 a low pass filter as well to further refine the signal.

The output signals from the right and left amplifiers 90 and 98 are coupled to the inputs of a side load operational amplifier 106. The output of the side load operational amplifier 106 is the difference between the right and left amplifiers 90 and 98 and is the side load. The gain of the side load operational amplifier 106 is 0.5 in the preferred embodiment in order to prevent saturation of the output. Of course other gain values may be used to optimize the side load measurement.

The output signals from the top and bottom amplifiers 74 and 84 are coupled to a summing circuit 108. The summing circuit 108 adds the top and bottom strain values output from the top and bottom amplifiers 74 and 84. The output signals from the right and left amplifiers 90 and 98 are coupled to a summing circuit 110. The summing circuit 110 adds the right and left strain values output from the right and left amplifiers 90 and 98. Since the polarities of the right and left strain gauges 54 and 56 are reversed, the output of the summing circuit 110 is reversed from the output of 108.

The inputs of a draft load operational amplifier 112 are tied to the summing circuit 108 and the summing circuit 110. Thus, the output of the draft load operational amplifier 112 is the difference between the sum of the top and bottom amplifiers 74 and 84 and the sum of the right and left amplifiers 90 and 98. The output value of the draft load amplifier 112 is representative of the axial force which is the draft load value on the drawbar 16. The gain of the draft load gain operational amplifier 112 is 66.0 for the summing circuit 108 and 33.0 for the summing circuit 110 in the preferred embodiment in order to prevent saturation of the output. Of course other gain values may be used to optimize the draft load measurement.

The right and left strain gauges 54 and 56 have opposite polarities from the top and bottom gauges 50 and 52 in order to sense all strains differentially with amplifiers 104, 106 and 112. This causes the common mode noise caused by the voltage source 64 to be reduced or eliminated due to voltage cancellation. For the vertical load, the subtraction of the output of the amplifiers 74 and 84 in amplifier 104 allows the common mode noise on each amplifier 74 and 84 to be canceled by subtraction. For the horizontal load, the subtraction of the output of the amplifiers 90 and 98 in amplifier 106 allows the signal noise on each amplifier 90 and 98 to be canceled by subtraction. Finally, the reversed polarities of the right and left load gauges 54 and 56 allows the noise from the right and left amplifiers 90 and 98 to be subtracted from the noise from the top and bottom amplifiers 74 and 84 by the draft load amplifier 112, allowing the noise to be canceled by subtraction.

Any signal offsets are adjusted to zero by adjusting the digital to analog converter 82. Each of the amplifiers 74, 84, 90 and 98 is zeroed in the following manner. An output signal from the digital to analog converter 82 is increased to the resistor 78 attached to the signal lead at the top strain gauge 50 until the vertical load output from the vertical load amplifier 104 decreases to ¼ of the voltage source 64. Additional output signals are added to the resistor 80 for fine adjustment. The signal to the resistor 86 attached to the signal lead at the bottom strain gauge 52 is increased until the vertical load signal is increased to half of the voltage source 64. Additional output signals are added to the resistor 88 for fine adjustment. These values are then stored and output to the resistors 78 and 80 attached to the top differential amplifier 74 and resistors 86 and 88 attached to the bottom differential amplifier 84.

Similarly, an output signal from the digital to analog converter 82 is increased to the resistor 94 attached to the signal load at the right strain gauge 54 until the side load output from the side load amplifier 106 decreases to ¼ of the voltage source 64. An additional output signal from the digital to analog converter is connected to the resistor 96 for fine adjustment. The signal to the resistor 100 attached to the signal lead at the left strain gauge 56 is increased until the side load signal is increased to half of the voltage source 64. Additional signals are output to resistors 96 and 102 for fine adjustment. These values are then stored and output to the resistors 94 and 96 attached to the right differential amplifier 90 and resistors 100 and 102 attached to the left differential amplifier 98.

Finally, an output signal from the digital to analog converter 82 is increased to the resistors 78 and 86 attached to the signal lead to the top and bottom strain gauges 50 and 52 until the draft output from the draft amplifier 112 decreases to ¼ the voltage source 64. An additional output signal is output to the resistors 80 and 88 for fine adjustment. A signal to the resistors 94 and 100 attached to the signal lead to the left and right strain gauges 54 and 56 is increased until the draft signal is increased to half of the voltage source 64. Additional signals are output to resistors 96 and 102 for fine adjustment. These values are then stored and output to the resistors 94 and 96 coupled to the left differential amplifier 90; and resistors 100 and 102 coupled to the right differential amplifier 98; and resistors 78 and 80 coupled to the top differential amplifier 74; and resistors 86 and 88 coupled to the bottom differential amplifier 84 during the measurement of any signal. The above described zeroing operation may be performed during circuit assembly or may be done during the sensor operation according to an operator or machine command.

It will be recognized by those skilled in the art that the present invention may be used in any number of applications requiring strain measurements. For example, many other pulled implements may use the present invention. Additionally, other work vehicles such as excavators, trenchers, combines, tractors, etc., may use the present invention to maximize the efficiency of pulled implements. Thus, the present invention is not limited by the foregoing descriptions but is intended to cover all modifications and variations that come within the scope of the spirit of the invention and the claims that follow.

What is claimed is:

1. A system for measuring the strain forces on a load bearing member having a top surface, a bottom surface, a right surface and a left surface, the system comprising:
    a top strain gauge located on the top surface of the load bearing member;
    a bottom strain gauge located on the bottom surface of the load bearing member;
    a right strain gauge located on the right surface of the load bearing member;
    a left strain gauge located on the left surface of the load bearing member;
    a voltage comparison circuit coupled to the output of the top, bottom, right and left strain gauges, having a top, bottom, right and left output derived from comparing the difference between the output of the top strain gauge and a constant value; the difference between the output of the bottom strain gauge and a constant value; the difference between the output of the right strain gauge and a constant value; and the difference between the output of the left strain gauge and a constant value, respectively;
    a vertical load circuit coupled to the top and bottom outputs which outputs the vertical load by determining the difference between the top and bottom outputs; and
    a side load circuit coupled to the right and left outputs which outputs the side load by determining the difference between the right and left outputs.

2. The system of claim 1, further comprising an axial force circuit having:
    a first summing circuit coupled to the top and bottom outputs and producing a sum of the top and bottom outputs;
    a second summing circuit coupled to the right and left outputs and producing a sum of the right and left outputs;
    a differential amplifier having an input coupled to the first summing circuit and an input coupled to the second summing circuit, which outputs the axial force by determining the difference between the outputs of the first and second summing circuits.

3. The system of claim 1 wherein the load bearing member is a drawbar attached to a work vehicle on one end and a load implement on the other end, the drawbar having a drawbar pivot hole on the end attached to the work vehicle and a hitch pin hole on the end attached to the load implement, wherein the top, bottom, right and left strain gauges are located proximate the hitch pin hole.

4. The system of claim 1 wherein the top, bottom, left and right strain gauges each are wire resistive gauge pairs having a first wire pattern with a source input and a signal output and a second wire pattern with a ground input and a signal output.

5. The system of claim 4 wherein the first and second wire pattern of the top, bottom, left and right strain gauges each are configured in an orthogonal pattern.

6. The system of claim 4 wherein the top and bottom strain gauges each have the source input tied to a voltage source, a ground input tied to a ground source, and a signal lead tied to the signal output of the first and second wire patterns; and
    wherein the left and right strain gauges each have the source input tied to the ground source, the ground input tied to the voltage source, and a signal lead tied to the signal output of the first and second wire patterns.

7. The system of claim 6 wherein the voltage comparison circuit further comprises:
    a top amplifier having a negative input coupled to the output of the top load gauge, and a positive input tied to the voltage divider circuit;
    a bottom amplifier having a negative input coupled to the output of the bottom load gauge, and a positive input tied to the voltage divider circuit;
    a right amplifier having a negative input coupled to the output of the right load gauge, and a positive input tied to the voltage divider circuit; and
    a left amplifier having a negative input coupled to the output of the left load gauge, and a positive input tied to the voltage divider circuit.

8. The system of claim 7 further comprising:
    a digital to analog converter having a series of outputs of analog voltage values;
    a top adjustment resistor, coupled to an output of the digital to analog converter and the output of the top gauge;
    a bottom adjustment resistor, coupled to an output of the digital to analog converter and the output of the bottom gauge;
    a right adjustment resistor, coupled to an output of the digital to analog converter and the output of the right gauge;
    a left adjustment resistor, coupled to an output of the digital to analog converter and the output of the left gauge; and wherein the digital to analog converter outputs a preset voltage value in order to zero the top, bottom, right and left outputs of the strain gauge outputs to the amplifiers.

9. The gauge of claim 8 further comprising:
a fine adjustment top resistor coupled to an output of the digital to analog converter and the output of the top gauge;
a fine adjustment bottom resistor coupled to an output of the digital to analog converter and the output of the bottom gauge;
a fine adjustment right resistor coupled to an output of the digital to analog converter and the output of the right gauge;
a fine adjustment left resistor coupled to an output of the digital to analog converter and the output of the left gauge;
wherein the fine adjustment resistors have substantially higher resistive values than the adjustment resistors and voltage values are input to the adjustment resistors for coarse adjustment, while voltage values are input to the fine resistors for fine adjustment.

10. A method of determining strain forces on a load bearing member having a top surface, a bottom surface, a right surface and a left surface, the method comprising the steps of:
measuring the strain on the top surface as a top strain signal produced by comparing the output of a top strain gauge with a constant voltage;
measuring the strain on the bottom surface as a bottom strain signal produced by comparing the output of a bottom strain gauge with a constant voltage;
measuring the strain on the right surface as a right strain signal produced by comparing the output of a right strain gauge with a constant voltage;
measuring the strain on the left surface as a left strain signal produced by comparing the output of a left strain gauge with a constant voltage;
measuring vertical load by determining the difference between the top and bottom signals; and
measuring side load by determining the difference between the left and right outputs.

11. The method of claim 10, further comprising the steps of:
summing top and bottom signals;
summing the right and left signals;
measuring the axial force by determining the difference between the sum of the top and bottom signals and the sum of the right and left signals.

12. The method of claim 10 wherein the load bearing member is a drawbar attached to a work vehicle on one end and a load implement on the other end, the drawbar having a drawbar pivot hole on the end attached to the work vehicle and a hitch pin hole on the end attached to the load implement, wherein the top, bottom, right and left strain gauges are located proximate the hitch pin hole.

13. The method of claim 10 wherein the top, bottom, left and right strain gauges each are wire resistive gauge pairs having a first wire pattern with a source input and a signal output and a second wire pattern with a ground input and a signal output.

14. The system of claim 13 wherein the first and second wire pattern of the top, bottom, left and right strain gauges each are configured in an orthogonal pattern.

15. The system of claim 13 wherein the top and bottom strain gauges each have the source input tied to a voltage source, a ground input tied to a ground source, and a signal lead tied to the signal output of the first and second wire patterns; and
wherein the left and right strain gauges each have the source input tied to the ground source, the ground input tied to the voltage source, and a signal lead tied to the signal output of the first and second wire patterns.

16. The method of claim 10 further comprising the steps of:
converting a series of preset digital adjustment inputs into a series of analog voltage zeroing values;
adjusting the output of the top gauge by a first analog voltage value;
adjusting the output of the bottom gauge by a second analog voltage value;
adjusting the output of the right gauge by a third analog voltage value; and
adjusting the output of the left gauge by a fourth analog voltage value.

* * * * *